FREQUENCY GENERATOR

Filed June 27, 1952 2 Sheets-Sheet 1

INVENTOR.
Norman B. Schrock
BY Flehr & Swain
ATTORNEYS

May 29, 1956 N. B. SCHROCK 2,748,272

FREQUENCY GENERATOR

Filed June 27, 1952 2 Sheets-Sheet 2

INVENTOR.
Norman B. Schrock
BY Flehr & Swain
ATTORNEYS 2,748,272

FREQUENCY GENERATOR

Norman B. Schrock, Los Altos, Calif., assignor to Hewlett-Packard Company, Palo Alto, Calif., a corporation of California Application June 27, 1952, Serial No. 295,917

8 Claims. (Cl. 250—27)

This invention relates generally to apparatus of the type used in a wide variety of test and industrial electronic equipment for the generation of a desired frequency. The invention is particularly applicable to the generation of relatively low frequencies, as for example frequencies as low as 0.01 C. P. S.

Many conventional types of electronic frequency generators are not suited to the generation of very low frequencies. In many cases instability and drift are too large for applications where the requirements are exacting, and in addition relatively large values of circuit components are required. In other instances undesirable transients are present in the generated voltage. In general there has been a need in the electronic industry for a generator capable of stable operation at relatively low frequencies, as for example frequencies ranging from 1000 to 0.01 C. P. S.

In general it is an object of the present invention to provide a novel generator which is capable of providing stable operation in the low frequency range indicated above.

Another object of the invention is to provide a frequency generator capable of generating a desired waveform to a high degree of accuracy.

Another object of the invention is to provide a low frequency generator characterized by such features as the ease with which the generator frequency can be adjusted, by its stability at various frequencies, and by automatic compensation for changes in tube characteristics.

Additional objects and features of the invention will appear from the following description in which the preferred embodiment has been set forth in detail in conjunction with the accompanying drawing.

Referring to the drawing.

Figure 1:
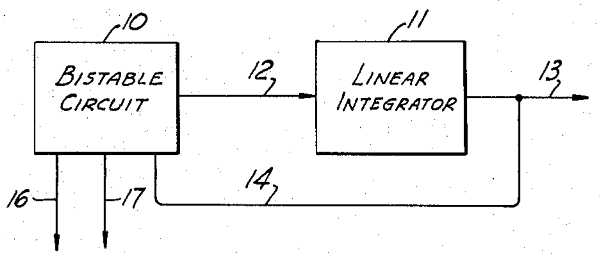
Figure 1 is a schematic circuit diagram illustrating the principles of the present invention.

As illustrated schematically in Figure 1, the present invention makes use of a bistable unit 10, in conjunction with a linear integrator 11. The integrator can be a simple capacitance or means which provides an effective capacitance. Lead 12 represents the output of the bistable circuit being applied to the input of the linear integrator, and line 13 represents the integrator output. Line 14 represents feedback of trigger voltage from the output of the linear integrator to the bistable circuit 10. Lines 16 and 17 represent application of upper and lower reference voltages to the bistable circuit.

Assuming that the bistable circuit is triggered at regular periods by voltage applied from the output of the linear integrator, a square voltage waveform is generated in the output of the bistable circuit, and is applied to the linear integrator. The output of the linear integrator is triangular in waveform. As will be presently explained, the bistable circuit can be made and adjusted in such a fashion that when the voltage of the triangular waveform becomes substantially equal to one of the reference voltages, the bistable circuit is triggered to flip the same to its other conducting condition.

Figure 2:
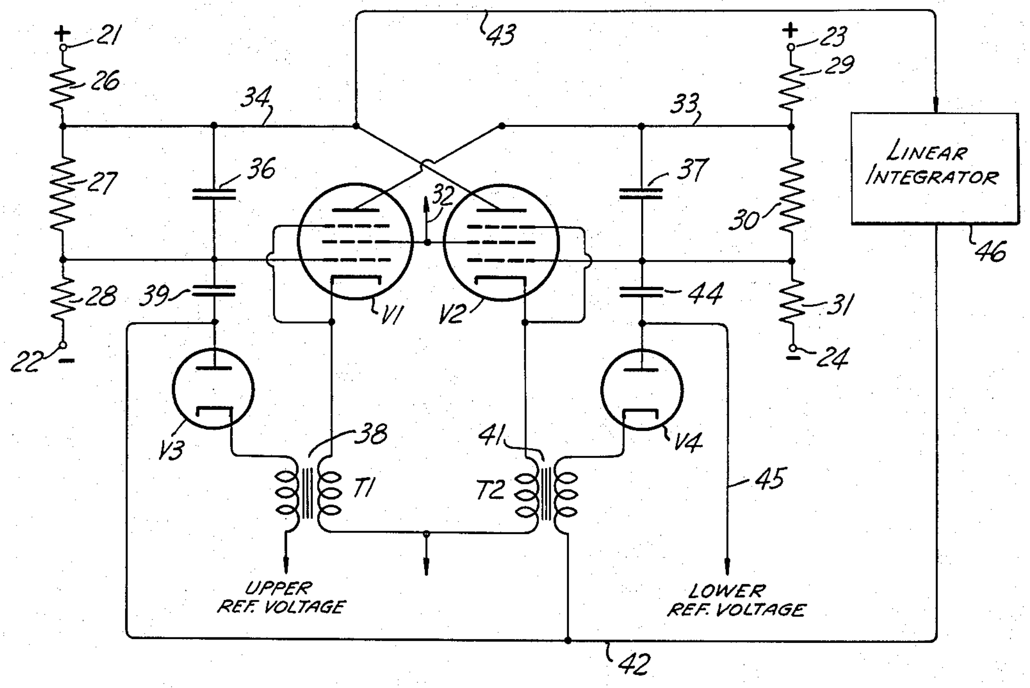
Figure 2 is a circuit diagram illustrating a circuit which can be used in accordance with the present invention.

The circuit illustrated in Figure 2, which incorporates the invention generally shown in Figure 1, employs the vacuum tubes V1, V2, V3 and V4. Tubes V3 and V4 are diodes, while tubes V1 and V2 can be pentodes such as known by manufacturer's specifications as No. 6AU6. Terminals 21 and 22 represent positive and negative connections to a source of plate voltage for the tube V2, and terminals 23 and 24 are positive and negative terminal connections to a source of plate voltage for tube V1. Voltage dividing resistors 26 and 27 and 28 connect between terminals 21 and 22, and similar resistors 29, 30 and 31 connect between terminals 23 and 24. The control grid of tube V1 is connected to the point of connection between resistors 27 and 28, and the control grid of tube V2 is similarly connected to a point between resistors 30 and 31. Each tube has its suppressor grid connected to its cathode. The screens of the two tubes are connected together, and to a source of suitable biasing voltage through lead 32. The plate of tube V1 is connected by lead 33 to a point between resistors 29 and 30, and the plate of tube V2 is similarly connected by lead 34 to a point between resistors 26 and 27. Resistors 27 and 30 of the two voltage dividers are by-passed by condensers 36 and 37.

The cathode of tube V1 is coupled to its control grid through the transformer 38 (T1), and the diode V3. One terminal of the primary of transformer 38 is connected to the cathode of tube V1, the other terminal to the negative side of the plate voltage source. One side of the secondary of transformer 38 is connected to the cathode of tube V3, and the other side to a source of reference voltage. The plate of diode V3 is coupled to the grid of tube V1, through the coupling condenser 39.

Tube V2 is similarly connected with the transformer 41 (T2). The primary of this transformer has its one terminal connected to the cathode of tube V2, and its other side connected to the negative side of the plate voltage source. One side of the secondary of transformer 41 is connected to cathode of the diode V4, and the other side to the lead 42, which also connects to the plate of the diode V3. The plate of V4 is coupled to the control grid of tube V2 by condenser 44. Lead 43 connects the input side of the linear integrator 46 to the lead 34, while lead 42 connects the output of integrator 46 back to the multivibrator formed by tubes V1 and V2. Lead 45 connects the plate of the diode V4 with the so-called lower reference voltage.

As previously mentioned, the tubes V1, V2, V3 and V4 form a multivibrator or bistable unit. If one should disconnect each of the condensers 39 and 44, to avoid inductive coupling between the grid to cathode of each of the tubes V1 and V2, the remaining circuit (exclusive of the integrator 46) would be substantially the same as the wel-known flip-flop or Eccles-Jordan trigger circuit. With such a circuit (Eccles-Jordan) when one of the tubes V1 or V2 is conducting, its plate voltage is relatively low and thereby impresses a low voltage on the grid of the other cut-off tube. The high voltage at the plate of the cut-off tube results in a high grid voltage on the conducting tube. Thus a stable condition is maintained in either one of the two conducting states. When a pulse is applied to an element of either tube in the proper polarity to upset this stable condition, there is a regenerative action which rapidly transfers the conducting state from one tube to the other. Thus if a negative pulse is supplied to the grid of the conducting tube, a decrease in plate current results, which is accompanied by an increase in plate voltage. Such increased plate voltage serves to increase the grid voltage on the nonconducting tube, thereby causing conduction to start which results in a lower plate voltage on that tube. The lower plate voltage on the tube which is beginning to conduct causes a further reduction in grid voltage on the tube that originally received the negative trigger. This regenerative action rapidly causes the first tube to be cut off and to complete the transfer to the second stable condition. Such operation is well understood by engineers familiar with the Eccles-Jordan trigger circuit.

In the special bistable unit of Figure 2, there are two circuits which employ a regenerative loop to produce a pulse when two input voltages are equal. One voltage is one of the reference voltages, and the other is voltage applied from the output of the integrator 46. Each of such circuits may be compared to what is commonly known as the "Multiar" circuit, which is a simple and accurate amplitude comparison means. One such circuit is composed of tubes V1, V3 and transformer T1, and the other of tubes V2, V4 and transformer T2. Considering the first, regeneration from grid to cathode of tube V1 can occur only when tubes V1 and V3 are both conducting. V3 becomes conducting only when the trigger voltage becomes equal to a reference voltage. When this condition obtains, the combination operates as a self pulsing or blocking oscillator. When tube V1 is in the conducting state and tube V3 cut off, no regeneration occurs because tube V3 appears like an open circuit and there is no inductive coupling from the grid of tube V1 to cathode. The plate and cathode of tube V3 are resistively coupled to two external voltages. The cathode of tube V3 is connected to the upper reference voltage, and the plate is connected to the output of the integrator 46.

With my arrangement the output voltage of the integrator is caused to be less than, but approaching, the upper reference voltage, when tube V1 is conducting. When the integrator output voltage has increased to very nearly reference voltage, tube V3 becomes conducting. This results in a low impedance across tube V3, thus completing the regenerative grid-cathode loop of tube V1. At this time the system V1, V2 and T1 becomes an oscillator and, as the grid of tube V1 is caused to go negative, there results the necessary trigger to initiate a transfer of stable states in the multivibrator composed of tubes V1 and V2, as previously described. As soon as the conducting state is transferred to V2, the Multiar composed of V1 and V3 is out of operation because V1 is cut off. Now the output of the integrator starts to fall towards the lower reference voltage. Because V2 is conducting, the regenerative loop from its grid to cathode will be complete when the integrator output has fallen nearly to the level of the lower reference voltage and V4 begins to conduct. When this condition obtains, the Multiar composed of V2, V4 and transformer T2 becomes oscillatory and therefore provides a negative impulse on the grid of V2. This initiates the triggering action necessary to return to the stable state in which V1 is conducting, thus completing one cycle of operation.

The integrator 46 is constructed in such a manner as to provide a linear voltage rise at its output over a period equal to one-half cycle of the square wave, produced by the bistable unit. For example, if one desires to generate a frequency of the order of 1 cycle per 100 seconds, the time constant RC must be much larger than 50 seconds. It is theoretically possible to obtain such a time constant by the use of a condenser of sufficient size. However such a large condenser is impractical for precision purposes. By the use of an integrator of the Miller type the electrical values of the components required are greatly reduced. In a Miller integrator a high gain amplifier is connected across the integrating capacitor. The amplifier reduces the value of the required time constant by a factor equal to the gain of the amplifier. In addition the amplifier increases the voltage out of the integrator by the same factor. Thus the slope of the voltage out of the integrator remains the same as with a condenser, but the linear range of the integrator is greatly increased.

The output of the integrator is a triangular wave having a time rate of voltage change directly proportional to the magnitude of the square wave input. Because the square wave period depends on the time required for the integrator output to swing between the two reference voltages, it follows that the frequency of generation of both the triangular and square waves depends upon three factors. First, the reference voltages; second, a rate constant associated with the integrator which depends upon its internal parameters; and third, the magnitude of the square wave applied. In the present generator I adjust the frequency by adjusting the magnitude of this square wave, as by adjustment of a potentiometer.

Figure 3:
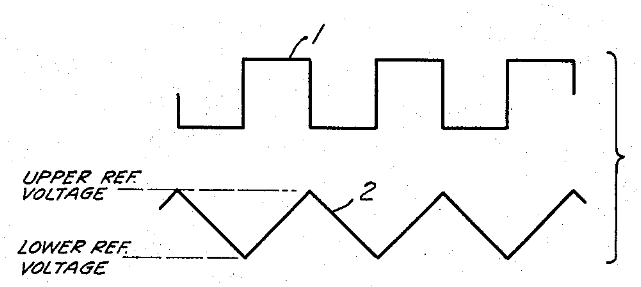
Figure 3 illustrates curves showing the square and triangular waveforms which are generated.

The two curves of Figure 3 represents the square wave output of the multivibrator unit, and the triangular wave integrator output. The upper and lower reference voltages indicated in conjunction with the second curve correspond to the upper and lower reference voltages indicated in Figures 1 and 2. The horizontal lines representing these voltages coincide with the peaks of the triangular wave. This serves to illustrate the manner in which the rising voltage of the integrator output triggers the bistable unit when a voltage is reached corresponding to the upper reference voltage. Likewise as the integrator voltage falls to a value corresponding to the lower reference voltage, the bistable unit is restored to its original conducting state.

Figure 4:
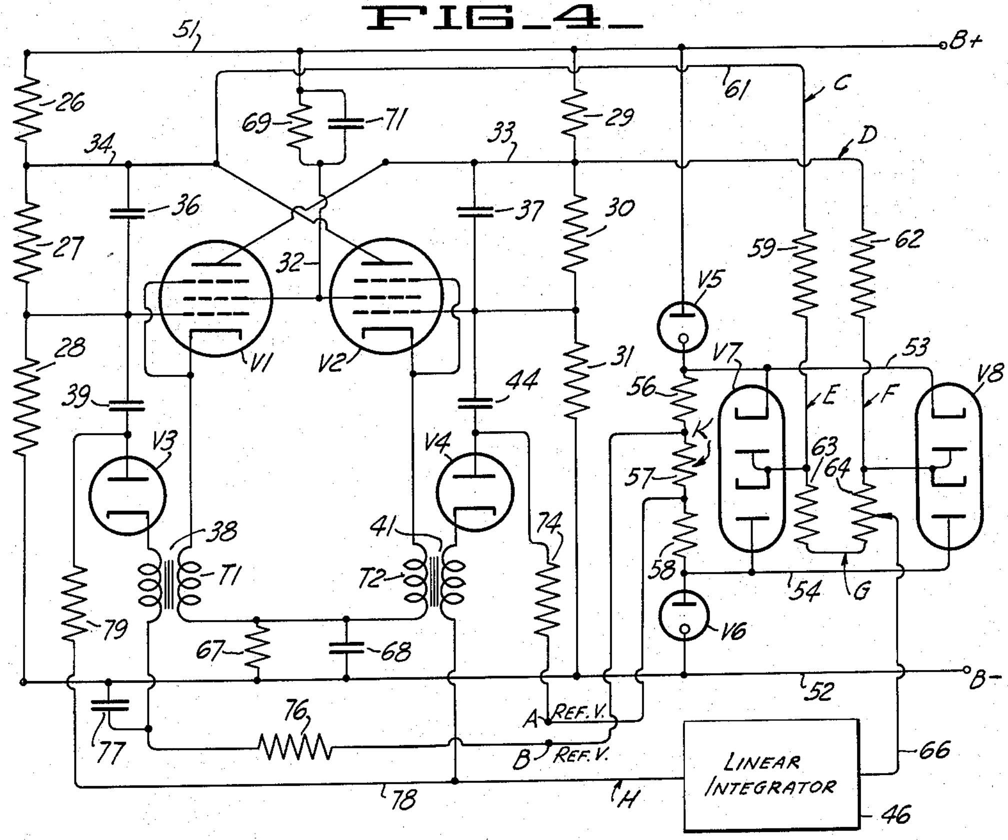
Figure 4 is a circuit similar to Figure 2, but incorporating clamping means.

In the more elaborate circuit of Figure 4, means are provided for clamping the square waves appearing at the plates of the bistable unit. Clamping is accomplished by a circuit including the tubes V7 and V8, which operate in conjunction with the tubes V5 and V6. Tubes V7 and V8 can be of the type known by manufacturer's specifications as No. 6AL5, and tubes V5 and V6 can be voltage regulator tubes of the type known by manufacturer's specifications as Nos. OA2(VR150) and OA3(VR75) respectively. Tubes V7 and V8 are connected to operate as four separate diodes. The conductors 51 and 52 in this instance represent the positive and negative connections to a source of plate or B battery supply. The regulator tube V5 is connected between the conductor 51, and lead 53, which connects to two of the cathodes of tubes V7 and V8. Regulator tube V6 connects from the negative conductor 52 to a lead 54 which interconnects to plates of the tubes V7 and V8. Series resistor sections 56, 57 and 58 connect between the leads 53 and 54. One cathode and one plate of tube V7 are connected together and to the plate of tube V2 through the resistor 59, and lead 61. Similarly one plate and one cathode of tube V8 are connected together and to the plate of tube V1 through the resistor 62 and lead 33. Series resistor sections 63 and 64 connect between the plates just mentioned, and the tap on resistor 64 (which serves as a potentiometer) connects with the integrator input lead 66. The frequency of operation of the generator is adjusted by adjusting the potentiometer 64.

Negative bias for the cathodes of the tubes V1 and V2 is shown being supplied by the resistor 67, which connects to the negative B battery conductor 52, and which is shown shunted by the bypass condenser 68.

Bias for the screen grids of tubes V1 and V2 is shown being supplied through resistor 69, which is shunted by condenser 71, and is connected to the plus B conductor 51. The lower and upper reference voltages appear at the terminals or points A and B. Terminal A connects to the connecting point between resistor sections 57 and 58, while terminal B connects to the point of connection between resistor sections 56 and 57. It will be evident that these points of connection can be adjusted as desired to obtain the desired reference voltages. Terminal A also connects with the plate of tube V4 in series with resistor 74. Terminal B connects to one side of the secondary of transformer T1 in series with resistor 76 and bypass condenser 77 connects from conductor 52 to the same transformer terminal.

The integrator output lead 78 is connected to the plate of diode V3 through resistor 79 and to one terminal of the secondary of transformer T2, the other terminal of which connects with the cathode of tube V2.

With reference to clamping as used in my generator, it can be explained that the square waves generated by the bistable unit are subject to amplitude variations due to aging of the tubes V1 and V2, and therefore it is desirable to clamp the square wave in order to maintain a desired frequency calibration. The square wave at the plate of tube V1 is coupled to tube V8 through the resistor 62. The action of tube V8 is such that if the applied waveform has peak excursions in excess of the potentials on the cathode and plate, these being determined by regulator tubes V5 and V6, a current will flow through resistor 62 which drops the voltage to very nearly the potential of the regulated element of the conducting tube. The action of the tube V7 is the same as tube V8, but 180° out of phase with it, because it is coupled to the plate of tube V2. In this way, waveforms appearing on the clamped sides of resistors 59 and 62 are assured to be of equal magnitude as well as 180° out of phase. It is possible to so proportion resistors 63 and 64 so that the full variation of resistor 64 covers a specified frequency range. Also it should be noted that the reference voltages are derived from the regulator tubes V5 and V6. Therefore if the voltage of the B battery source should vary slightly, both the square wave applied to the frequency control and the reference voltages would vary in the same ratio. The result is that although under such conditions the output rate of the linear integrator would vary slightly, so also will the limits of excursion from one reference voltage to the other. Therefore there would be a small change in amplitude of the triangular wave but no shift in frequency. This makes for good stability in the operation of the bistable unit and the linear integrator, when considered collectively as forming a frequency generator.

In one particular instance the vacuum tubes and the values of the resistors and condensers used in the circuit of Figure 4, were as follows: Vacuum tubes V1 and V2 were 6AU6 pentodes, and tubes V3 and V4 were each one-half of a 6AL5 tube. Tubes V5 and V6 were OA2(VR150) and OA3(VR75) respectively. Tubes V7 and V8 were each a 6AL5, and in all were equivalent to four separate diodes. The various resistors were as follows: 26, 68K (K equals 1000 ohms); 27, 330K; 28, 22K; 79, 12K; 67, 1500 ohms; 69, 56K; 76, 100K; 74, 12K; 31, 22K; 30, 330K; 29, 68K; 56, 12K; 57, 18K; 58, 30K; 59, 27K; 62, 27K; 63, 107.5K; 64, 100K. The various condensers were as follows: 36, 47 mmf.; 39, 500 mmf.; 68, 0.01 mf.; 71, 0.01 mf.; 77 0.01 mf.; 44, 500 mmf.; and 37, 47 mmf.

With the values specified above, the frequency was adjustable over a 15/1 range by adjusting the tap on potentiometer 64. Using an amplifier type integrator with a five megohm and one microfarad integrating network, the frequency was variable from .008 to .12 cycles per second.

Figure 5:
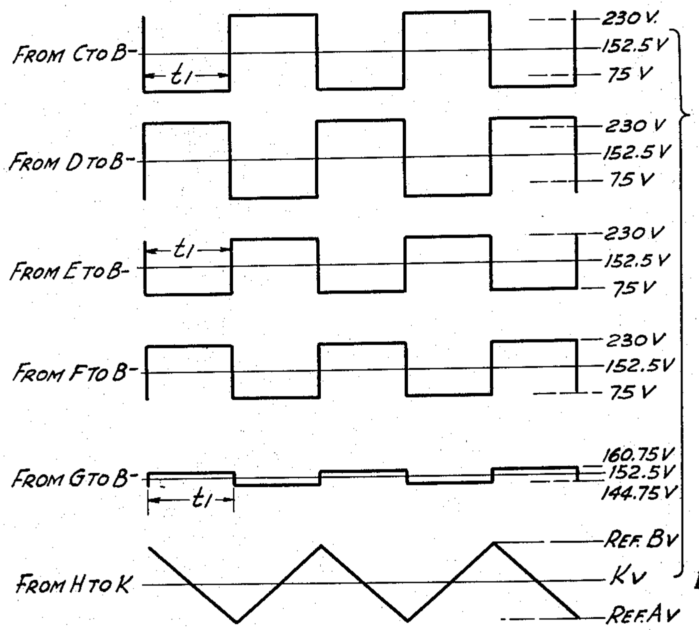
Figure 5 illustrates curves showing waveforms between various points of Figure 4.

Figure 5 illustrates waveforms appearing at various points in the circuit of Figure 4. Voltages are indicated as used in the foregoing example. The first two of these curves illustrate the square waves from C to B— and from D to B—. The third and fourth curves illustrate the square waves after clamping. The third curve illustrates the square waves from E to B—, and the fourth from F to B—. The fifth curve illustrates the square wave between G and B—. The sixth curve illustrates the triangular wave from the integrator, with the reference voltages at the apexes of the wave.

From the description of operation it can be seen that the triangular output voltage wave is closely regulated between fixed D. C. reference voltages. Thus, if the generator frequency is suddenly changed, either by adjusting the frequency control potentiometer, or by switching to a different condenser in the integrator circuit, there can be no transient voltage overshoot as is characteristic of conventional oscillators. This is especially important at frequencies as low as 0.01 C. P. S., where a switching transient in normal oscillators involves a stabilizing period of several minutes.

It will be evident that my frequency generator is useful in a wide variety of industrial and laboratory applications. For example it can be used in all instances where it is desired to provide voltage pulses with accurate timed interval spacing. The generator can be suitably coupled to other electronic equipment, as for example the input of further amplifying means, to produce amplified pulses of square or triangular waveform, depending upon the points to which the amplifying means is coupled. Also the generator can be used with other electronic means for shaping the square or triangular waveforms to any other waveform desired.

Subject matter disclosed and claimed herein is disclosed but not claimed in copending application Serial No. 227,368, filed May 21, 1951, which application is assigned to the same assignee as the present case.

I claim:

1. In a frequency generator, a bistable unit serving to generate a square waveform, said unit including two vacuum tubes connected regeneratively whereby said tubes are alternately conductive responsive to application of trigger voltage, each tube of said unit having a circuit connected between its control grid and cathode comprising a diode, a condenser and a transformer, the condenser being connected between the plate of the diode and the control grid of the associated tube and the transformer having its primary connected between the cathode and the negative side of the plate battery supply and its secondary connected to a source of reference voltage and to the diode cathode, thereby providing amplitude comparison means to effect triggering of the associated tube to shift the same to non-conductive state responsive to application of a trigger voltage which equals the reference voltage, means for applying reference voltages to both said circuits, an integrator coupled to the output of the bistable unit, and means for feeding back triggering voltage from the output of the integrator to each of said circuits for periodic triggering of the same, whereby triggering of said bistable unit occurs at the peaks of the triangular waveform developed by said integrator.

2. A frequency generator as in claim 1 together with means for clamping the square waves appearing at the plates of said vacuum tubes.

3. A frequency generator as in claim 1 together with means for adjusting the magnitude of the square wave applied by the bistable unit to said integrator to thereby adjust the frequency of operation of the generator.

4. In an electrical frequency generator, a bistable unit serving to generate pulses of square wave form, said unit including two vacuum tubes each having at least plate, cathode and control grid elements, said tubes being connected regeneratively whereby they are alternately conductive upon application of triggering voltages, integrating means coupled to the output of said bistable unit, amplitude comparison means connected to receive the voltage output of said integrating means, and means for applying upper and lower reference voltages to said amplitude comparison means whereby triggering of said bistable unit occurs when the output voltage of said integrating means is equal to the corresponding reference voltage.

5. In an electrical frequency generator, a bistable unit serving to generate pulses of square wave form, said unit including two vacuum tubes each having at least plate, cathode and control grid elements, said tubes being connected regeneratively whereby they are alternately conductive upon application of triggering voltages, integrating means coupled to the output of said bistable unit, first amplitude comparison means connected to one of said vacuum tubes and also connected to receive the voltage output of said integrating means, second amplitude comparison means connected to the other of said vacuum tubes and also connected to receive the voltage output of said integrating means, means for applying an upper reference voltage to said first amplitude comparison means, means for applying a lower reference voltage to said second amplitude comparison means, whereby said first and second amplitude comparison means trigger the said bistable unit when the voltage output of said integrating means is equal to the corresponding reference voltage.

6. Apparatus as in claim 5 wherein said amplitude comparison means comprise circuits which employ a regenerative loop to generate trigger pulses.

7. In an electrical frequency generator, a bistable unit serving to generate pulses of square wave form, said unit including two vacuum tubes each having at least plate, cathode and control grid elements, said tubes being connected regeneratively whereby they are alternately conductive upon application of triggering voltages, integrating means coupled to the output of said bistable unit, an amplitude comparison means connected to the control grid of each of said tubes, means for coupling the voltage output of said integrating means to said amplitude comparison means, means for applying an upper reference voltage to one of said amplitude comparison means, means for applying a lower reference voltage to the other of said amplitude comparison means, whereby said amplitude comparison means trigger the said bistable unit when the voltage output of said integrating means is equal to the corresponding reference voltage.

8. Apparatus as in claim 7 wherein said amplitude comparison means comprises two regenerative loops each including the anode to cathode path of a comparison diode.

References Cited in the file of this patent

UNITED STATES PATENTS

| | | |
|---|---|---|
| 2,265,290 | Knick | Dec. 9, 1941 |
| 2,414,486 | Rieke | Jan. 21, 1947 |
| 2,452,549 | Cleeton | Nov. 2, 1948 |
| 2,485,395 | Lord | Oct. 18, 1949 |
| 2,492,736 | Custin | Dec. 27, 1949 |
| 2,589,465 | Weiner | Mar. 18, 1952 |
| 2,591,677 | Cleeton | Apr. 8, 1952 |
| 2,605,404 | Valley | July 29, 1952 |
| 2,661,421 | Talamini et al. | Dec. 1, 1953 |